United States Patent
Turner (10) Patent No.: US 12,227,269 B2
(45) Date of Patent: Feb. 18, 2025

(54) ADJUSTABLE CORD LOCKING ARRANGEMENT

(71) Applicant: ROSWELL CANADA INC., Acheson (CA)

(72) Inventor: Bradley J. Turner, Melbourne, FL (US)

(73) Assignee: ROSWELL CANADA INC., Acheson (CA)

( * ) Notice: Subject to any disclaimer, the term of this patent is extended or adjusted under 35 U.S.C. 154(b) by 0 days.

(21) Appl. No.: 18/203,457

(22) Filed: May 30, 2023

(65) Prior Publication Data

US 2023/0382501 A1    Nov. 30, 2023

Related U.S. Application Data

(60) Provisional application No. 63/346,394, filed on May 27, 2022.

(51) Int. Cl.
| | |
|---|---|
| *F16G 11/00* | (2006.01) |
| *B63B 32/77* | (2020.01) |
| *F16G 11/10* | (2006.01) |
| *F16G 11/14* | (2006.01) |

(52) U.S. Cl.
CPC .............. *B63B 32/77* (2020.02); *F16G 11/10* (2013.01); *F16G 11/14* (2013.01)

(58) Field of Classification Search
CPC ............. Y10T 24/1412; Y10T 24/2121; Y10T 24/4773; Y10T 24/1397; Y10T 24/3918; Y10T 24/3724; F16G 11/103; F16G 11/14; F16G 11/10; A43C 7/00; A43C 7/08

See application file for complete search history.

(56) References Cited

U.S. PATENT DOCUMENTS

| | | | | |
|---|---|---|---|---|
| 3,296,669 | A * | 1/1967 | Elder, Jr. | F16G 11/103 |
| | | | | D8/383 |
| 3,744,098 | A * | 7/1973 | Bowers | F16G 11/103 |
| | | | | 294/132 |
| 6,094,783 | A * | 8/2000 | Parsons | F16G 11/14 |
| | | | | 24/130 |
| 10,178,906 | B2 | 1/2019 | Eggleston et al. | |
| 10,709,205 | B2 * | 7/2020 | Harris | A43C 1/02 |
| 11,221,058 | B2 | 1/2022 | Romero | |
| 2005/0097780 | A1 * | 5/2005 | Pellegrini | A43C 7/08 |
| | | | | 36/50.1 |

(Continued)

*Primary Examiner* — Robert Sandy
*Assistant Examiner* — Michael S Lee
(74) *Attorney, Agent, or Firm* — Timothy H. Van Dyke; Wolter Van Dyke Davis, PLLC (57) ABSTRACT

An apparatus, including: a main body (302) including at least one passage (320A, 320B) configured to pass a first cord section and an adjacent second cord section therethrough; and at least one cord lock (322A, 322B). When neither the first cord section nor the second cord section is disposed in the at least one cord lock, the main body is free to move along the first cord section and the second cord section which are disposed in the at least one passage. When the first cord section and the second cord section are disposed in the at least one cord lock the main body is not free to move along the first cord section and the second cord section. The first cord section and the second cord section can be selective moved into an out of the at least one cord lock.

20 Claims, 13 Drawing Sheets

(56) References Cited

U.S. PATENT DOCUMENTS

| | | | |
|---|---|---|---|
| 2006/0107494 A1* | 5/2006 | Liao | F16G 11/14 24/18 |
| 2011/0225779 A1* | 9/2011 | Jones | B60P 7/0823 24/301 |
| 2012/0144700 A1* | 6/2012 | Zhao | A43C 1/00 36/99 |
| 2014/0020263 A1* | 1/2014 | Theuvenet | A43C 7/04 24/712.9 |
| 2019/0104807 A1* | 4/2019 | Delago | A43B 5/16 |
| 2019/0208866 A1* | 7/2019 | Dietrich | F16G 11/103 |
| 2020/0008532 A1* | 1/2020 | Chamberlain | A43C 1/00 |
| 2021/0071738 A1* | 3/2021 | Hancock | F16G 11/12 |
| 2021/0079978 A1* | 3/2021 | Kraus | F16G 11/14 |

\* cited by examiner

ADJUSTABLE CORD LOCKING ARRANGEMENT

FIELD OF THE INVENTION

The invention relates to an adjustable cord locking arrangement and a universal watersports board rack assembly that incorporates the adjustable cord locking arrangement.

BACKGROUND OF THE INVENTION

Adjustable cord lock arrangements have a variety of uses, including as retaining straps in various applications. An example application is retaining watersports boards in watersports board racks. Known adjustable cord lock arrangements that retain watersports boards in watersports board racks can be difficult to secure to the watersports board rack and can have limited adjustment that can be difficult to achieve. Consequently, there is room in the art for improvement.

BRIEF DESCRIPTION OF THE DRAWINGS

The invention is explained in the following description in view of the drawings that show.

DETAILED DESCRIPTION OF THE INVENTION

FIG. 1 to FIG. 4 show various views of an example embodiment of a universal watersports board rack assembly 100 having an example embodiment of a universal watersports board rack 200 and an example embodiment of an adjustable locking arrangement 300.

The universal watersports board rack 200 includes ends 202A, 202B and at least one crossbar 204A, 204B therebetween. End 202A includes tines 208AA, 208AB, 208AC. End 202B includes tines 208BA, 208BB, 208BC. Tines 208AA, 208AB and 208BA, 208BB cooperate to form receptacle 210A. Tines 208AB, 208AC and 208BB, and 208BC cooperate to form respective receptacle 210B. Each receptacle 210A, 210B is configured to receive watersports boards of varying sizes.

The adjustable locking arrangement 300 includes a main body 302 that is adjustable positionable along a cord 304 (for example, but not necessarily, a bungee cord). At one end, the adjustable locking arrangement 300 and the universal watersports board rack 200 interconnect via a connection assembly 220 on the main body 302. At the other end of the adjustable locking arrangement 300, ends 304EA and 304EB connect to tines 208AC, 208BC. When the cord 304 is flexible along its length, such as a bungee cord, adjustment of the position of the main body 302 also allows for greater control of an amount of tension in the cord 304 once the main body 302 is secured to the universal watersports board rack 200 via the connection assembly 220. This, in turn, enables adjustment of an amount of force with which the adjustable locking arrangement 300 retains the watersports board in the universal watersports board rack 200.

In this example embodiment, the connection assembly 220 includes a first portion 220R that is part of or connected to the universal watersports board rack 200 and a second portion 220MB that is part of or connected to the main body 302. In this example embodiment, the first portion 220R is a nub and the second portion 220MB is a loop configured to interlock with the nub. However, other suitable connection assemblies could suffice, such as a hook and loop, magnets, magnetic snaps, compliant stretching/locking devices etc. Ends of the tines 208AC, 208BC also include respective notches 212A, 212B configured to secure the cord 304 of the adjustable locking arrangement 300.

Figure 1A:
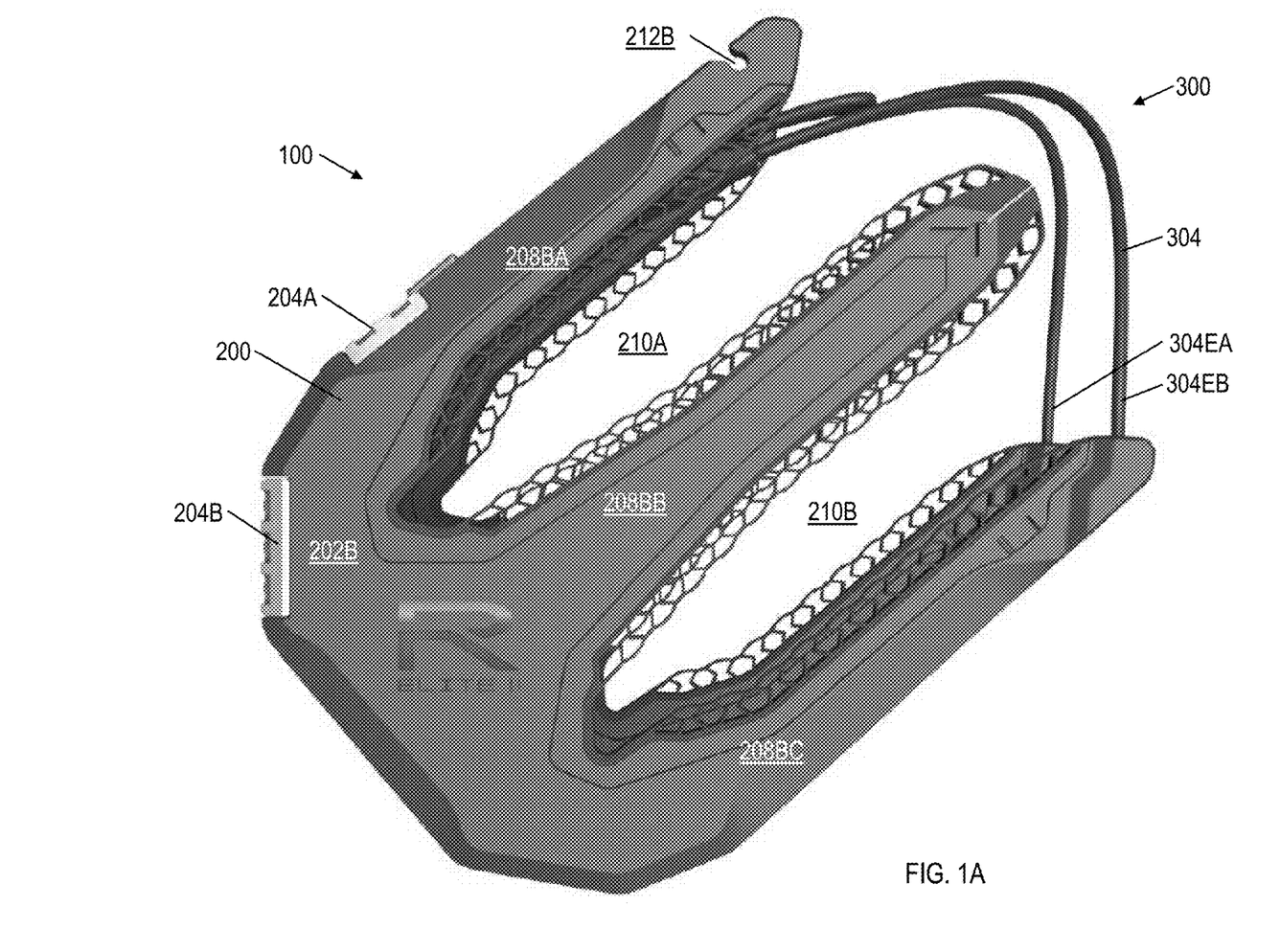
FIG. 1A to FIG. 1D show various views of an example embodiment of a universal watersports board rack assembly having an example embodiment of a universal watersports board rack and an example embodiment of an adjustable locking arrangement.
Figure 1B:
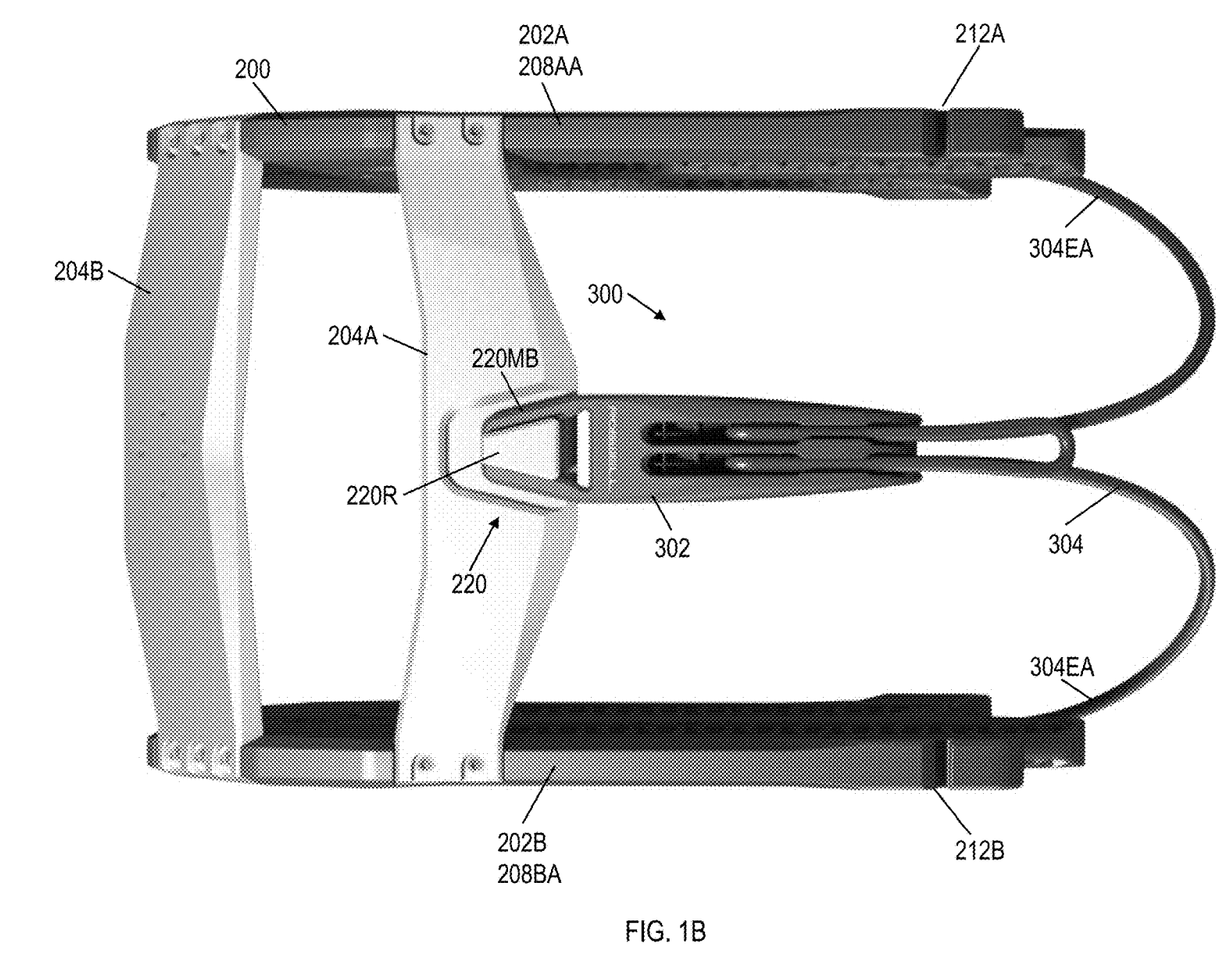
Figure 1C:
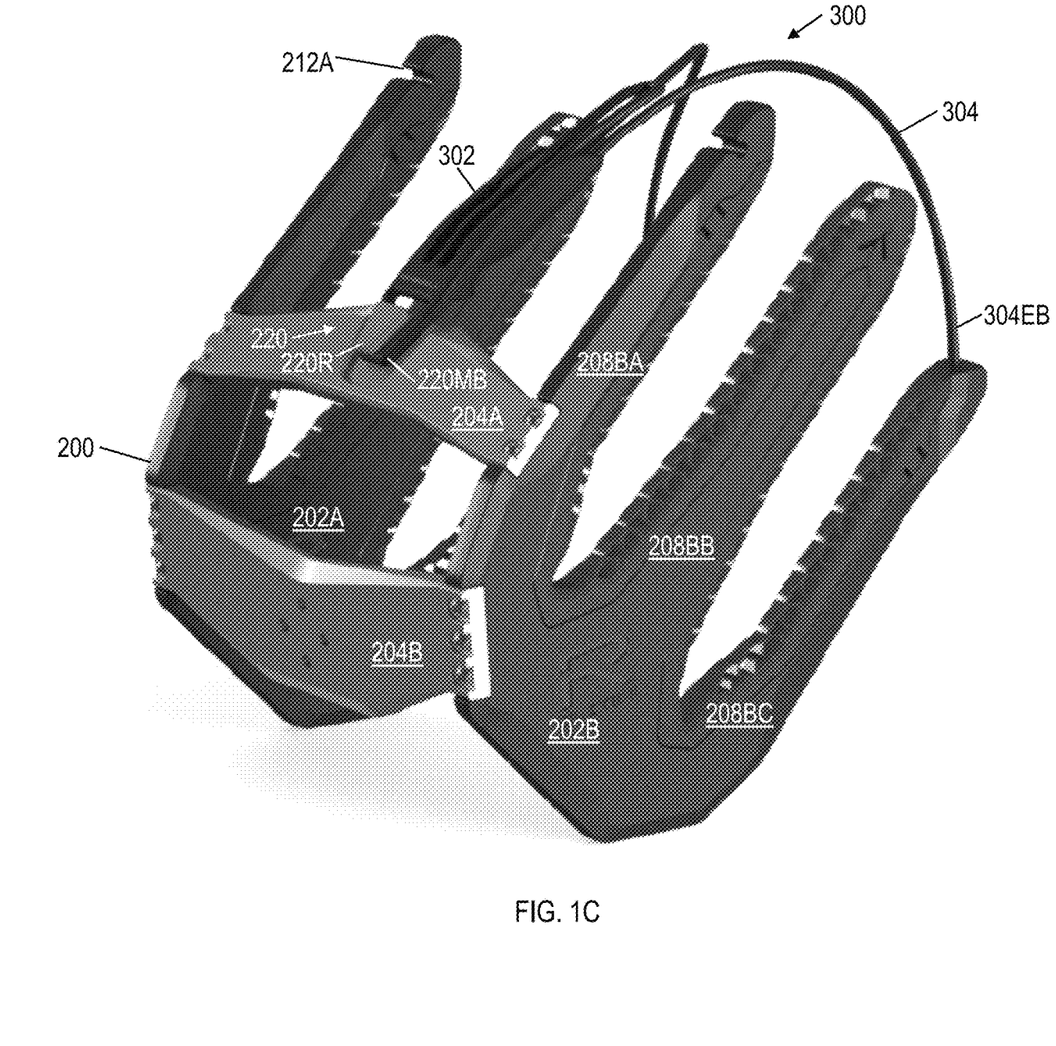
Figure 1D:
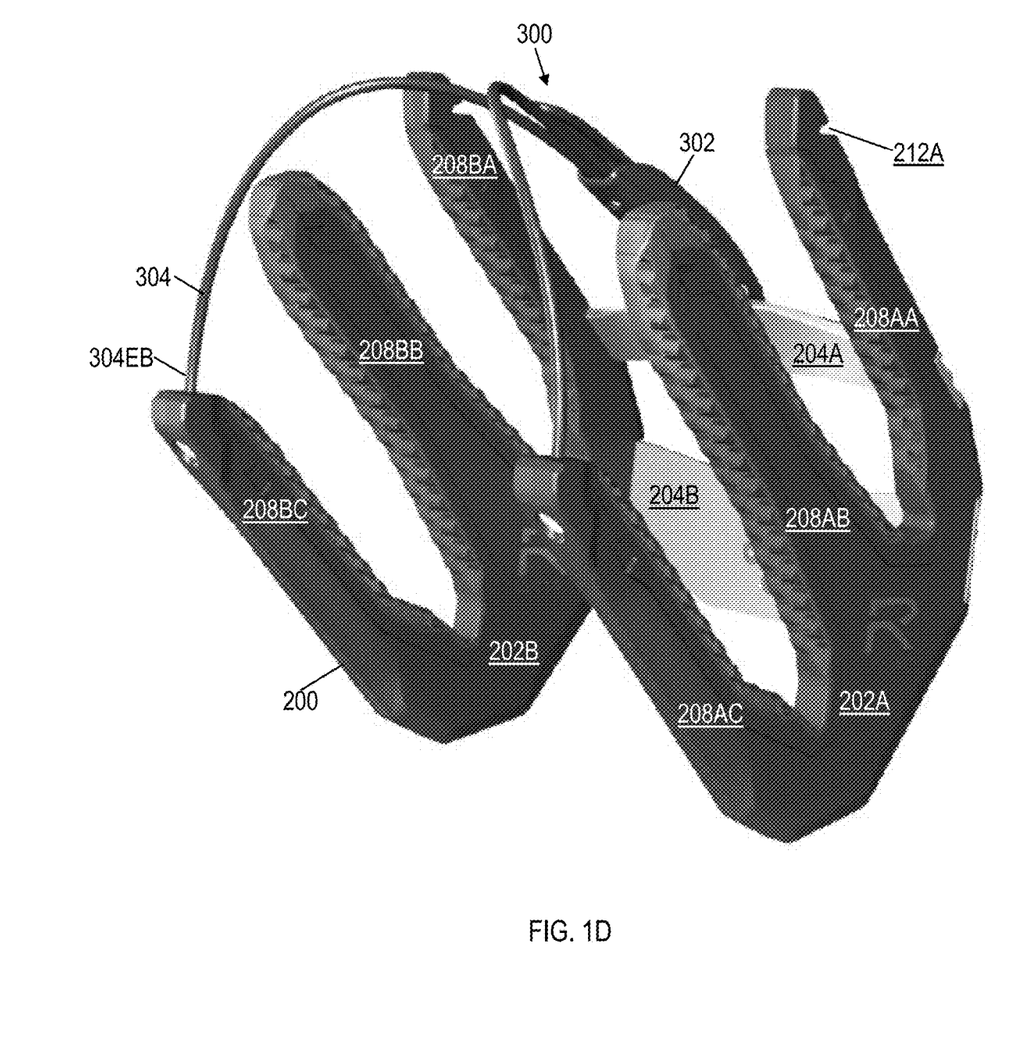
Figure 2A:
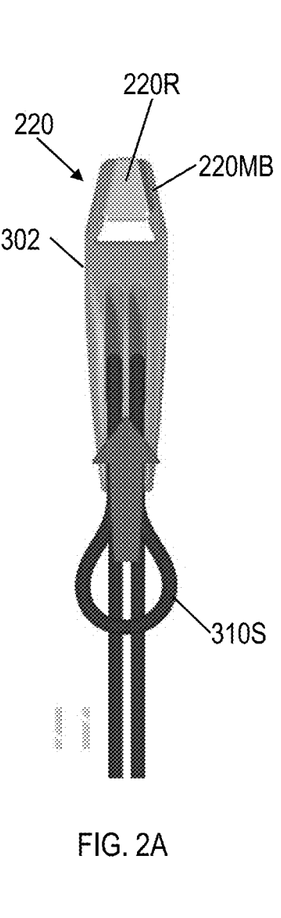
FIG. 2A to FIG. 2C illustrate adjustment of the adjustable locking arrangement of FIG. 1.
Figure 2B:
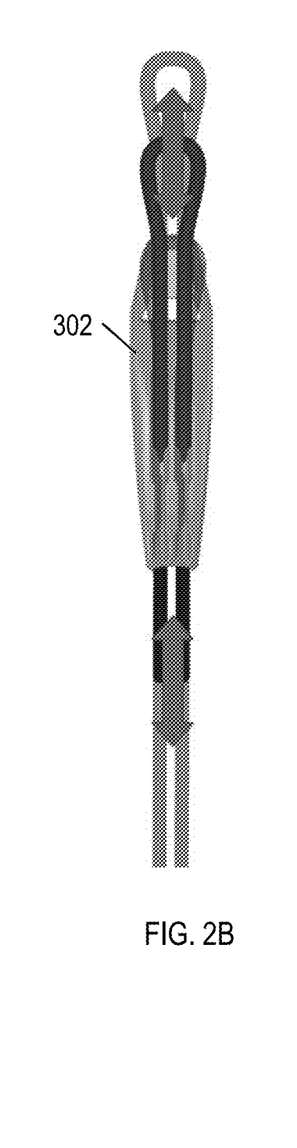
Figure 2C:
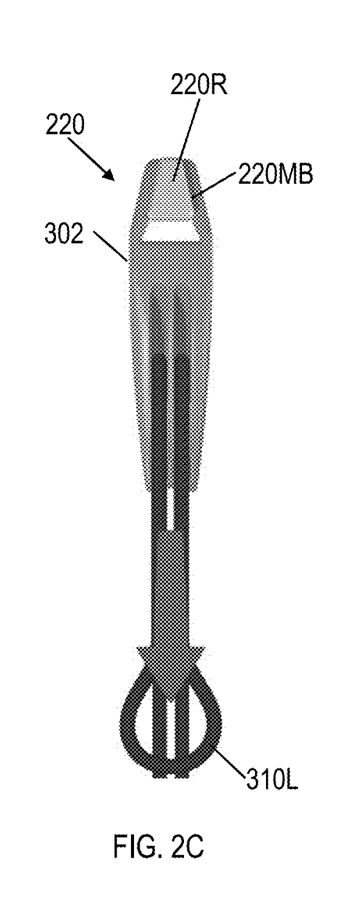

FIG. 2A to FIG. 2C illustrate an example adjustment of the adjustable locking arrangement 300 of FIG. 1. From a locked configuration and position shown in FIG. 2A, a relatively short loop 310S of the cord 204 extends from the main body 302 is lifted out of the main body 302 and the cord 304 is straightened. When the cord 204 is released from the main body 302 and straightened, the adjustable locking arrangement 300 is in an unlocked configuration where the main body 302 is free to move along/relative to the cord 304 as shown in FIG. 2B. (Up and down as shown in FIG. 2B.) Stated alternately, in the unlocked configuration, the cord 304 is free to move relative to the main body 302. To lock the main body 302 and the cord 304 in a fixed position relative to each other, the cord 304 is pulled back and lowered into the main body 302. In this example, once this is done, a relatively longer loop 310L extends from the main body 302. The main body 302 can be moved and selectively locked into any position relative to the cord 304 by using this procedure in either direction. When the cord 304 is a single cord that forms the loop 310S, 310L as shown, the loop 310S, 310L acts as a convenient handle for grabbing the cord 304.

Figure 3:
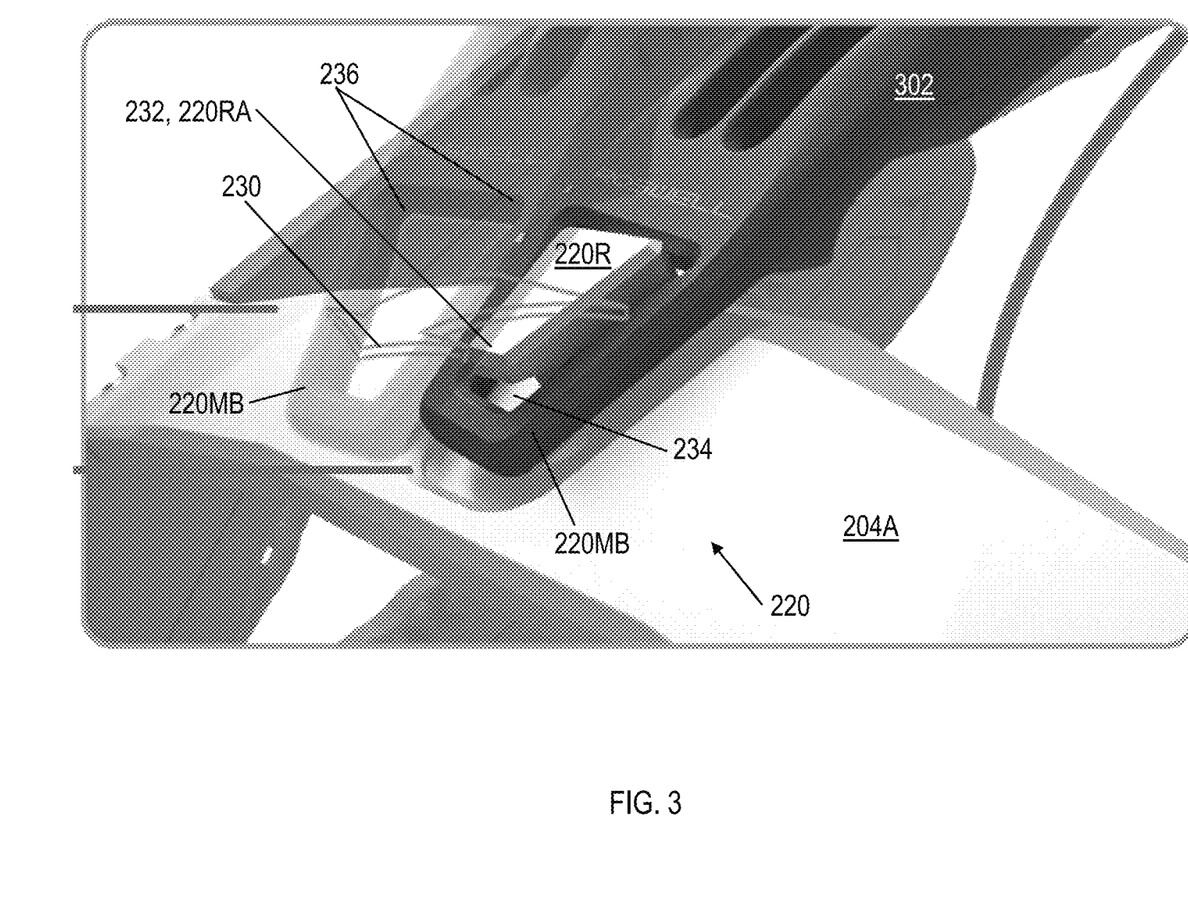
FIG. 3 illustrates decoupling the adjustable locking arrangement of FIG. 1 from the universal watersports board rack.

FIG. 3 illustrates decoupling the connection assembly 220. In this example embodiment, the second portion 220MB (the loop) hooks over the first portion 220R (the nub) to secure the adjustable locking arrangement 300 to the universal watersports board rack 200. The connection assembly 220 can be decoupled by lifting the main body 302 up and forward as shown by arrow 230. This unhooks the second portion 220MB (the loop) from an overhang 232 of the first portion 220R (the nub) that traps the first portion 220R thereunder. In this example embodiment, the first portion 220R has a wedge (e.g., trapezoidal) shape and an opening 234 formed by the second portion 220MB has a matching wedge (e.g., trapezoidal) shape.

In the example embodiment shown, the overhang 232 is disposed at an apex 220RA of the first portion 220R (the nub) and along both sides adjacent the apex 220RA. In other example embodiments, the overhang 232 may extend only at the apex 220RA, or the overhang 232 may extend around an entire perimeter of the first portion 220R (the nub). To accommodate the overhang 232 during the decoupling, the second portion 220MB (the loop) may include enlarged corners 236 through which the overhang 232 may fit. Including the enlarged corners 236 allows for a relatively close fit between the first portion 220R and the second portion 220MB while providing a way to move the second portion 220MB over the overhang 232 when decoupling. If the cord 304 is very tight while the first portion 220R and the second portion 220MB are secured to each other, the cord 304 can be unlocked from the main body 302 to make it easier to move the main body 302 and decouple the connection assembly 220.

Figures 4A, 5A:
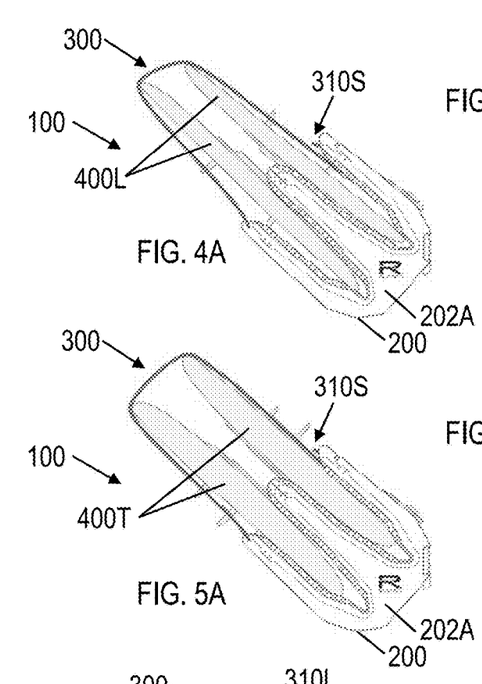
FIG. 4A shows a side view of the universal watersports board rack assembly with two large watersports boards installed.
FIG. 5A shows a side view of the universal watersports board rack assembly with two thick watersports boards installed.
Figure 4B:
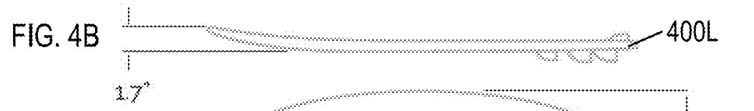
FIG. 4B and FIG. 4C show side and top views of one of the two large watersports boards of FIG. 4A.
Figure 4C:
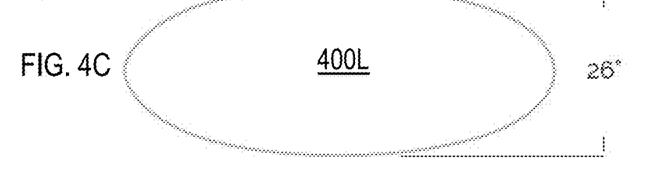

FIG. 4A shows a side view of the universal watersports board rack assembly 100 with two large watersports boards 400L installed. FIG. 4B and FIG. 4C show side and top views of one of the two large watersports boards 400L of FIG. 4A. As can be seen in FIG. 4A, the adjustable locking arrangement 300 has been adjusted out to fit the two large watersports boards 400L and thereby has the relatively short loop 310S extending from the main body 302.

Figures 5B, 5C:
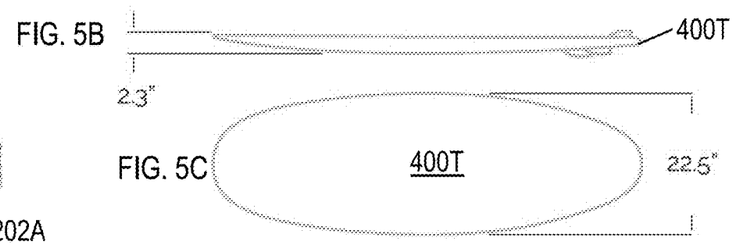
FIG. 5B and FIG. 5C show side and top views of one of the two thick watersports boards of FIG. 5A.

FIG. 5A shows a side view of the universal watersports board rack assembly 100 with two thick watersports boards 400T installed. FIG. 5B and FIG. 5C show side and top views of one of the two thick watersports boards 400T of FIG. 5A. As can be seen in FIG. 5A, the adjustable locking arrangement 300 has been adjusted out to fit the two thick watersports boards 400T and thereby has the relatively short loop 310S extending from the main body 302.

Figure 6A:
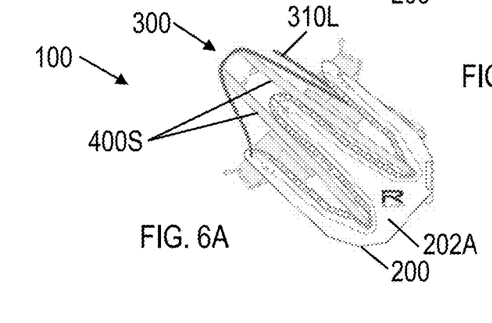
FIG. 6A shows a side view of the universal watersports board rack assembly with two small watersports boards installed.
Figures 6B, 6C:
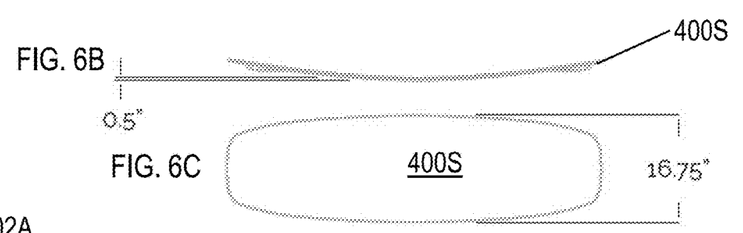
FIG. 6B and FIG. 6C show side and top views of one of the two small watersports boards of FIG. 6A.

FIG. 6A shows a side view of the universal watersports board rack assembly 100 with two small watersports boards 400S installed. FIG. 6B and FIG. 6C show side and top views of one of the two small watersports boards 400S of FIG. 6A. As can be seen in FIG. 6A, the adjustable locking arrangement 300 has been adjusted in to fit the two small watersports boards 400S and thereby has the relatively longer loop 310L extending from the main body 302.

The adjustable locking arrangement 300 can be infinitely adjusted within its range of adjustment to accommodate a variety of board sizes and combinations of different board sizes being stored in the universal watersports board rack 200.

Figures 7A, 7B, 7C:
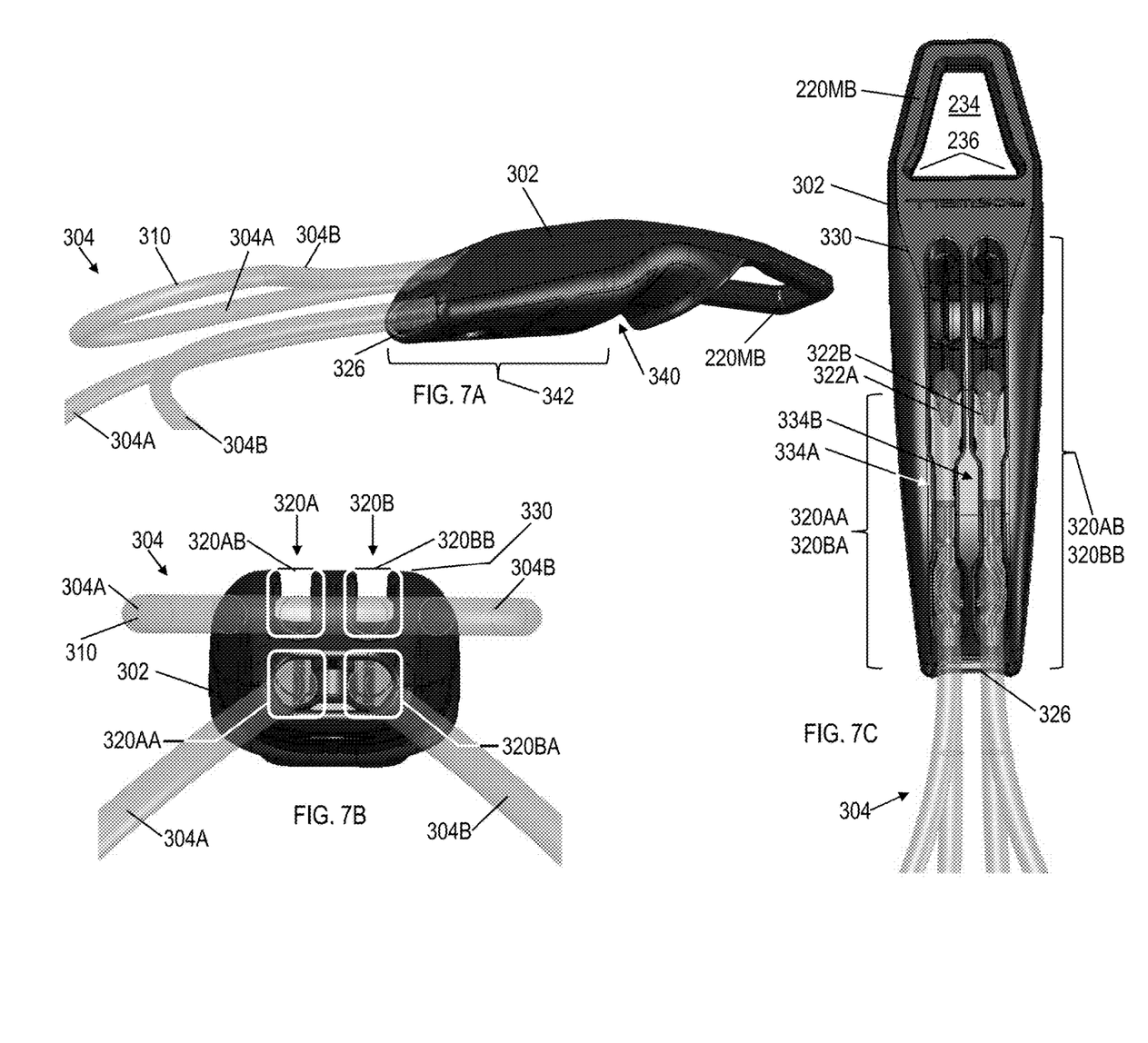
FIG. 7A to FIG. 7C show various views of a main body of the adjustable locking arrangement of FIG. 1 with an example embodiment of a cord.
Figure 8A:
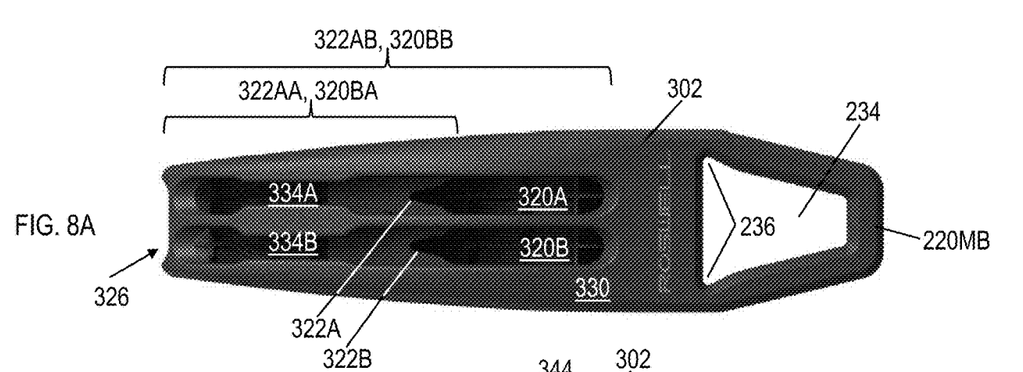
FIG. 8A to FIG. 8C show various views of the main body without the cord.
Figure 8B:
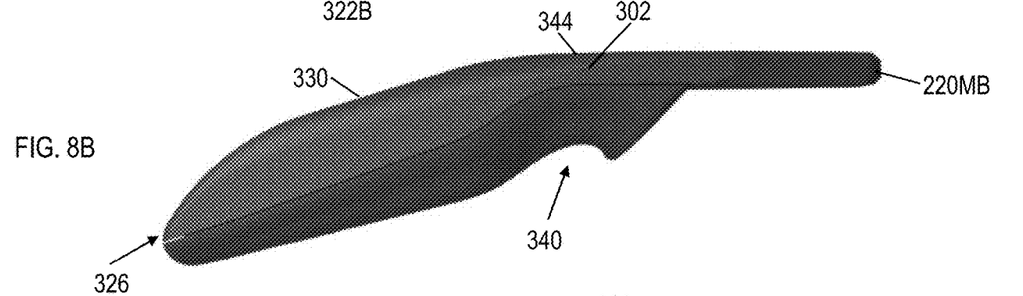
Figure 8C:
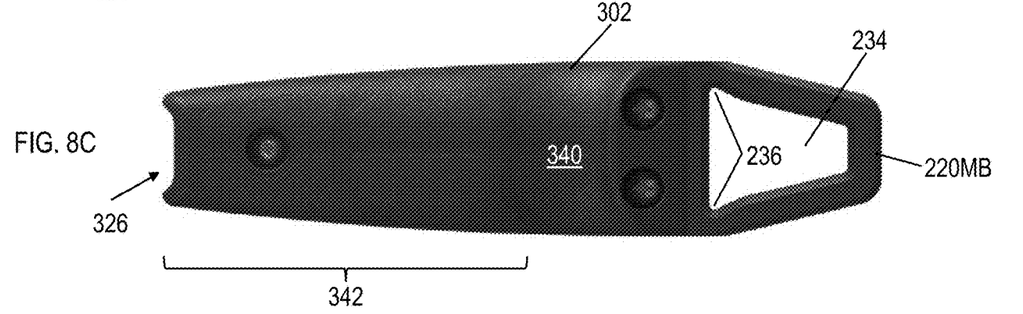

FIG. 7A to FIG. 7C show various views of the main body 302 of the adjustable locking arrangement 300 of FIG. 1 with the cord 304. FIG. 8A to FIG. 8C show various views of the main body 302 without the bungee cord.

The cord includes a first cord section 304A and a second cord section 304B. In this example embodiment, there is one cord 304 and the first cord section 304A and the second cord section 304B are connected to each other and form the loop 310. However, they need not be connected to each other, in which case the first cord section 304A and the second cord section 304B would be parts of different/discrete cords.

The main body 302 includes at least one passage. In this example embodiment, there are two passages; a first passage 320A configured to pass the first cord section 304A therethrough, a second passage 320B disposed adjacent the first passage 320A and configured to pass the second cord section 304B therethrough. The main body 302 includes at least one cord lock. In this example embodiment, there are two cord locks. A first cord lock 322A is configured to receive therein and lock the first cord section 304A in position relative to the first passage 320A, and a second cord lock 322B is configured to receive therein and lock the second cord section 304B in position relative to the second passage 320B.

In this example embodiment, the first cord lock 322A is disposed in the first passage 320A and between a first portion 320AA of the first passage 320A and a second portion 320AB of the first passage 320A. In this example embodiment, the second cord lock 322B is disposed in the second passage 320B and between a first portion 324BA of the second passage 320B and a second portion 324BB of the second passage 320B. Accordingly, the first portion 320AA of the first passage 320A extends from an opening 326 to the first cord lock 322A. The second portion 320AB of the first passage 320A extends from the first cord lock 322A onward. Likewise, the first portion 320BA of the second passage 320B extends from the opening 326 to the second cord lock 322B. The second portion 320BB of the second passage 320B extends from the second cord lock 322B onward.

As can be seen in FIG. 7C, the first cord lock 322A and the second cord lock 322B include a V-shape in which the first cord section 304A and the second cord section 304B are wedged to lock the cord sections in position. Any tension in the first cord section 304A disposed in the first portion 320AA of the first passage 320A will cinch the first cord section 304A into the first cord lock 322A and maintain the lock. Likewise, when the second cord section 304B is folded over as shown in FIG. 7C, any tension in the second cord section 304B disposed in the second portion 320AB of the first passage 320A will further cinch the first cord section 304A into the first cord lock 322A and maintain the lock. Unfolding and straightening the folded over portion of the first cord section 304A disposed in the second portion 320AB of the first passage 320A will pull the first cord section 304A upward (as shown in FIG. 7C) and out of the first cord lock 322A so that the first cord section 304A bypasses the first cord lock 322A. This frees the first cord section 304A and the main body 302 to move relative to each other while the first cord section 304A remains disposed in the first portion 320AA of the first passage 320A. This motion is possible because the second portion 320AB of the first passage 320A opens through an outer surface 330 of the main body 302.

The first portion 320AA and the second portion 320AB of the first passage 320A define a concave shaped circuit for the first passage 320A and are thereby configured to cause the first cord section 304A to form a corresponding concave cord shape when the first cord section 304A is fully disposed in the first passage 320A as seen in FIG. 7A to 7C. The first portion 320AA of the first passage 320A and the second portion 320AB of the first passage 320A are configured to position the first cord lock 322A inside a peak of each corresponding concave cord shape.

The second portion of the at least one passage includes at least one retention feature. In the example embodiment shown, the second portion 320AB of the first passage 320A includes a first retention feature 334A and the second portion 320BB of the second passage 320B includes a second retention feature 334B. Each retention feature is configured to retain the respective cord section in the respective second portion of the respective passage (e.g., by squeezing/clamping the cord therein). However, operation of the adjustable locking arrangement 300 does not require positioning the cord sections in the respective retention features.

When the first cord section 304A is fully disposed in the first passage 320A and the second cord section 304B is fully disposed in the second passage 320B, the main body 302 can be held by a user without the user feeling the cord 304 between the user's hand and the main body 302.

In this example embodiment, the second passage 320B and the second cord lock 322B are configured to be adjacent to and the same as the first passage 320A and the first cord lock 322A. However, the first passage 320A and the second passage 320B need not be the same as each other.

In this example embodiment, the main body 302 is configured as a dual/reversible grip that can be used with the second portion 220MB (the tip) of the main body 302 pointing toward or away from the user. The main body 302 optionally includes texturing on the outer surface 330 to improve the grip. A groove 340 is disposed into the outer surface 330 of the main body 302 and oriented transverse to the first portions 320AA, 320BA of the passages 320A, 320B. A user can grab the main body 302 so that the second portion 220MB (the tip) points away from the user. This is accomplished by placing an index finger in the groove 340, remaining fingers around a grip portion 342, and a thumb on a top 344 of the main body 302 approximately above the groove 340 (as shown in FIG. 7A). The result is a natural/ergonomic grip on the main body 302 with the second portion 220MB (the tip) pointing away. Uniquely, the user can also grab the main body 302 so that the second portion 220MB (the tip) points toward the user. This is accomplished by placing a pinky finger in the groove 340, remaining fingers around the grip portion 342, and a thumb on a top 344 of the main body 302 near the opening 326. The result is a natural/ergonomic grip on the main body 302 with the second portion 220MB (the tip) pointing toward the user. The dual/reversable grip allows the user to manipulate the main body 302 regardless of an orientation of the universal watersports board rack 200 relative to the user.

This configuration makes for a simple readjustment of the position of the main body 302 relative to the first cord section 304A and the second cord section 304B. A user can simply grasp the main body 302 with a first hand. With a second hand the user can then lift the portions of the first cord section 304A and the second cord section 304B that extend from the main body 302. The user can then position the main body 302 as desired along the first cord section 304A and the second cord section 304B using the first hand, and then lower the first cord section 304A and the second cord section 304B back into the main body 302 using the second hand. This will permit adjustment the position of the main body 302 and lock the main body 302 relative to the first cord section 304A and the second cord section 304B in any location along the first cord section 304A and the second cord section 304B.

In an alternate example embodiment, there may be only one cord passage that is configured to accommodate both the first cord section 304A and the second cord section 304B. Similarly, the at least one cord passage may include only one first portion and more than one second portion, or more than one first portion and only one second portion. Any combinations of passages and portions is possible.

Likewise, there may be only one cord lock that is configured to accommodate both the first cord section 304A and the second cord section 304B. Moreover, the cord lock need not be disposed within the main body 302. Instead, the cord lock can be disposed externally. In such an example embodiment, the first portion of the at least one passage may run through the main body 302 and there may be no second portion of the at least one passage.

Figure 9:
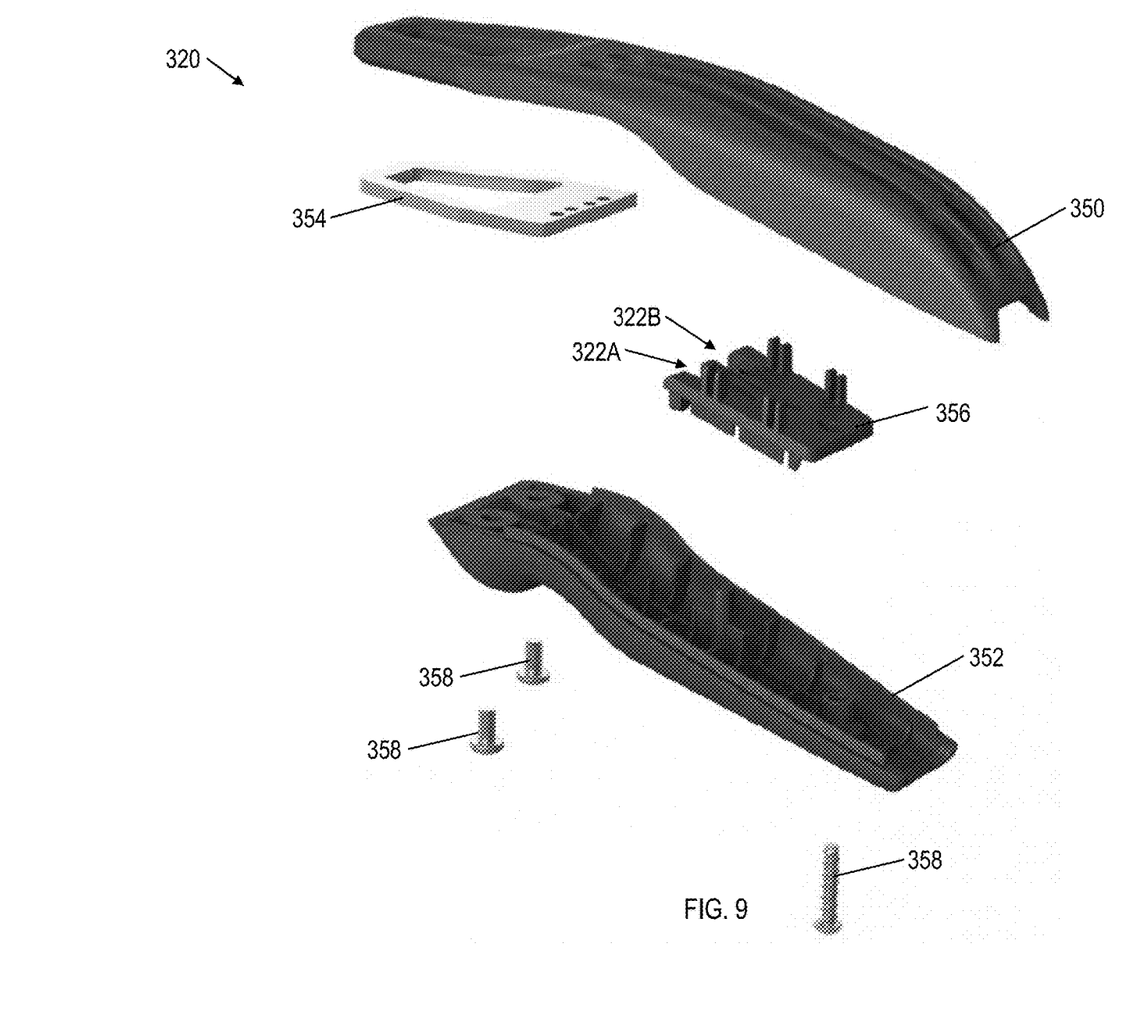
FIG. 9 shows an exploded view of the main body of FIG. 1.
Figure 10A:
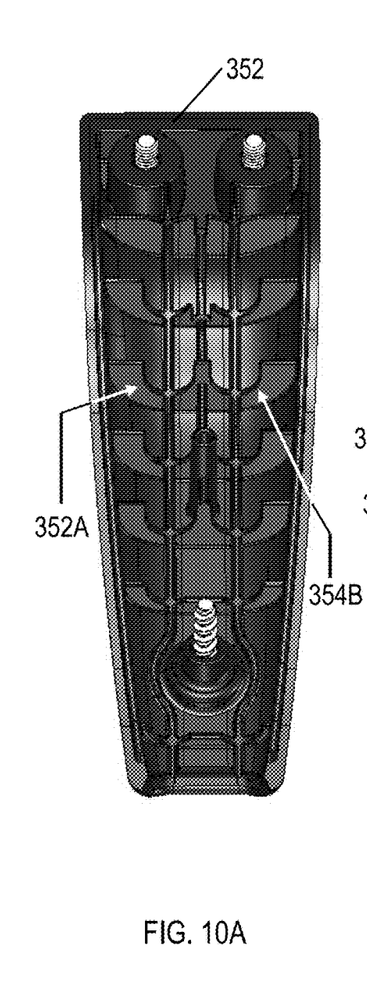
FIG. 10A to FIG. 10D show a lower portion of the main body of FIG. 1 from above and in various states.
Figure 10B:
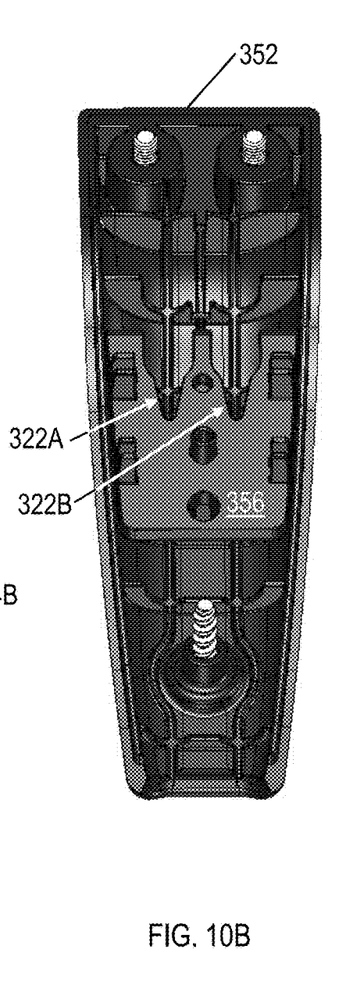
Figure 10C:
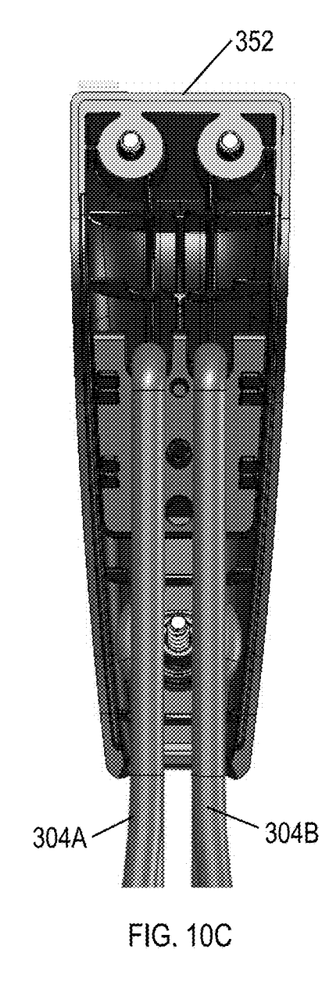
Figure 10D:
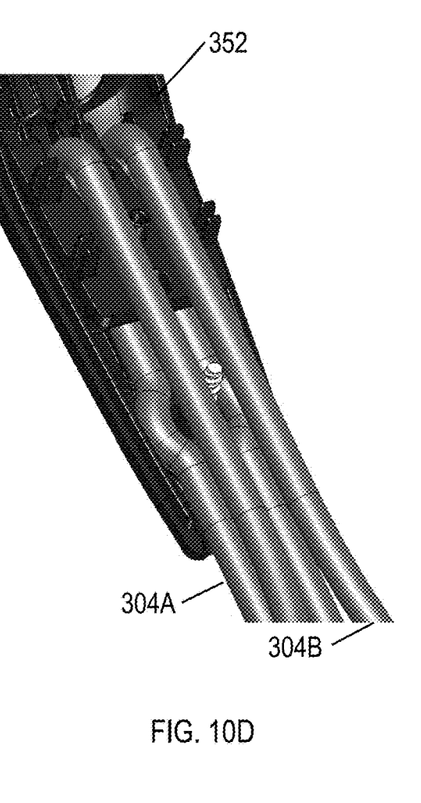

FIG. 9 shows an exploded view of the main body 302 of FIG. 1. In this example embodiment, the main body 302 includes an upper portion 350, a lower portion 352, a reinforcing insert 354, a locking center insert 356 (which includes the first cord lock 322A and the second cord lock 322B), and fasteners 358. The main body 302 of this example embodiment may be composed of more or fewer pieces. Variations may be formed via molding, subtractive manufacturing processes, additive manufacturing processes, and/or a combination thereof. The main body 302 and the reinforcing insert 354 may be composed of any suitable material, including plastics and metals.

FIG. 10A to FIG. 10D show the lower portion 352 of the main body 302 of FIG. 1 from above and in various states. The lower portion 352 includes first recesses 354A and second recessed 354B configured to receive the first cord section 304A and the second cord section 304B respectively. The locking center insert 356 fits onto the lower portion 352. The first cord section 304A and the second cord section 304B wrap around the locking center insert 356 when locked in the first cord lock 322A and the second cord lock 322B respectively and disposed in the second portion 320AB and the second portion 320BB respectively.

Figure 11A:
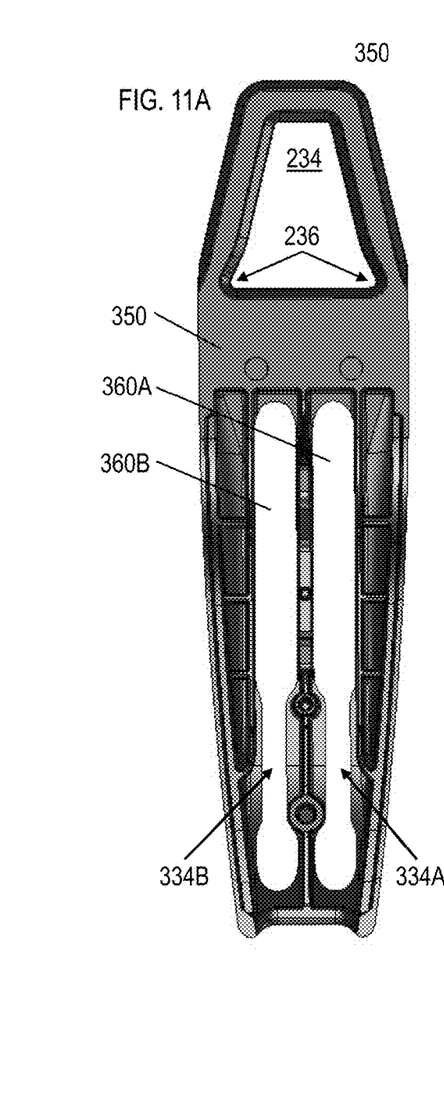
FIG. 11A to FIG. 11C show an upper portion of the main body of FIG. 1 from below and in various states.
Figure 11B:
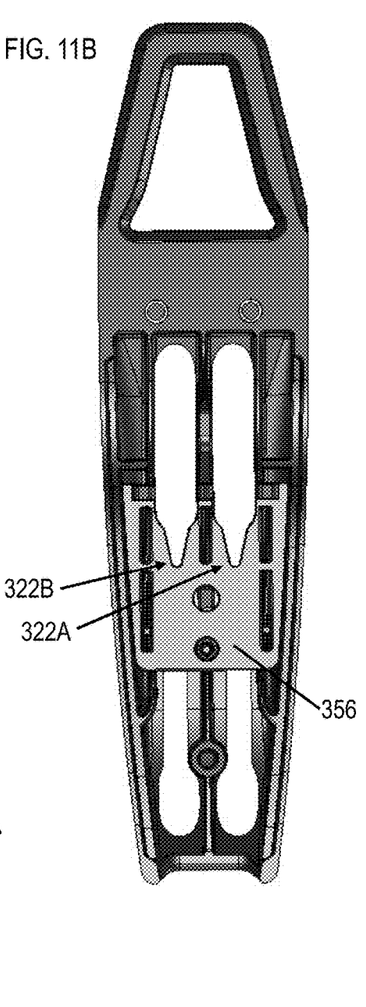
Figure 11C:
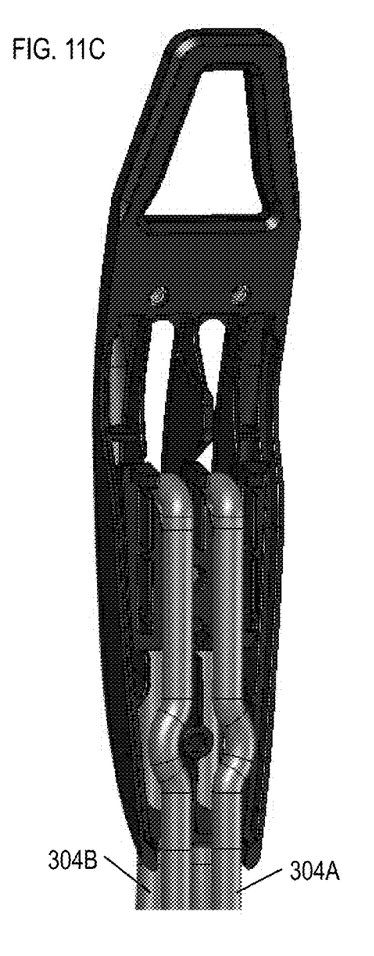

FIG. 11A to FIG. 11C show the upper portion 350 of the main body of FIG. 1 from below and in various states. The upper portion 350 defines the second portion 320AB of the first passage 320A and from the second portion 320BB of the second passage 320B. Slots 360A, 360B provide access from the second portion 320AB of the first passage 320A and from the second portion 320BB of the second passage 320B through the outer surface 330 of the main body 302 respectively. The locking center insert 356 also fits into the upper portion 350 when the lower portion 352 and the upper portion 350 are assembled together.

Figure 12A:
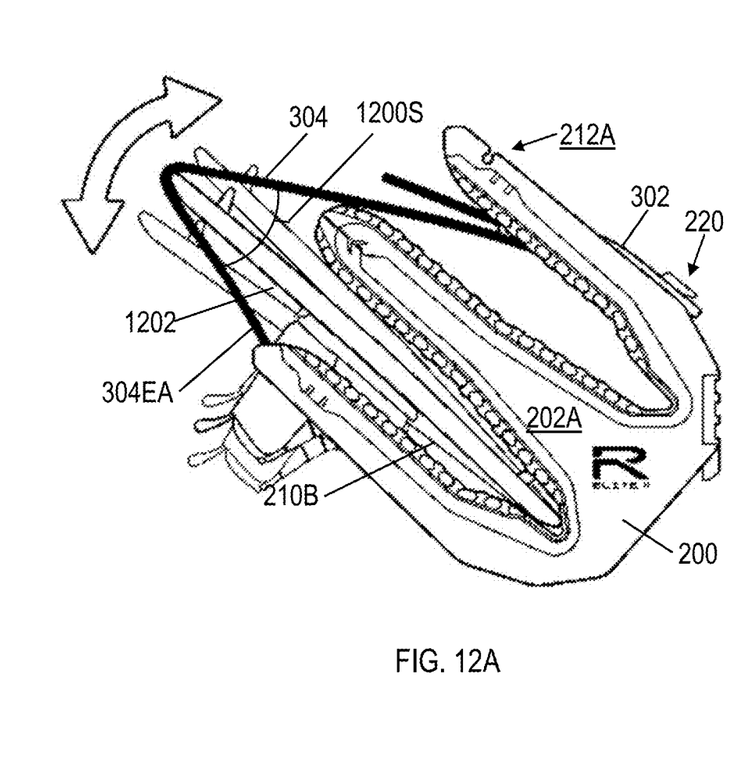
FIG. 12A to FIG. 12B illustrate an example embodiment of a notch feature of the universal watersports board rack of FIG. 1.
Figure 12B:
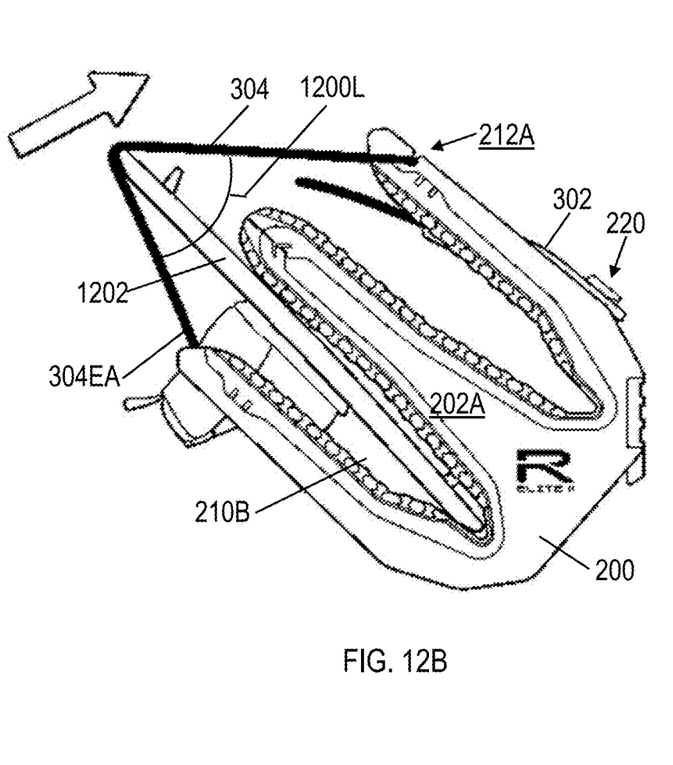

FIG. 12A to FIG. 12B illustrate an example embodiment of the notches 212A, (212B not visible in FIG. 12A and FIG. 12b) of the universal watersports board rack 200 of FIG. 1. When the notches 212A, 212B are not used, as is shown in FIG. 12A, a relatively small angle 1200S may be formed in the cord 304. This relatively small angle 1200S may cause a watersports board 1202 disposed in the receptacle 210B to take a first position shown in FIG. 12A. By placing the cord 304 in the notches 212A, 212B, a new, relatively large angle 1200L may be created. This relatively large angle 1200L may cause a watersports board 1202 disposed in the receptacle 210B to take a second position shown in FIG. 12B. This increases positioning flexibility when one position of the watersports board 1202 is deemed preferable to the other.

As has been disclosed above, the adjustable locking arrangement 300 is compact, durable, and ergonomic and provides increased flexibility and ease of use for a variety of situations. When used in conjunction with the universal watersports board rack 200, the resulting universal watersports board rack assembly 100 enables greater positioning flexibility in a device that is secure and yet very simple and intuitive to use. Consequently, this represents an improvement in the art.

While various embodiments of the present invention have been shown and described herein, it will be obvious that such embodiments are provided by way of example only. Numerous variations, swapping of features among embodiments, changes, and substitutions may be made without departing from the invention herein. Accordingly, it is intended that the invention be limited only by the spirit and scope of the appended claims.

The invention claimed is:

1. An apparatus, comprising:
a main body comprising a first passage configured to pass a first cord section therethrough, an adjacent second passage configured to pass a second cord section therethrough; a first cord lock disposed in the first passage, and a second cord lock disposed in the second passage;
wherein when neither the first cord section nor the second cord section is disposed in the respective cord lock the main body is free to move along the first cord section and the second cord section;
wherein when the first cord section and the second cord section are disposed in the respective cord lock the main body is not free to move along the first cord section and the second cord section,
wherein the first cord section and the second cord section can be selective moved into an out of the respective cord lock thereby enabling selective locking of the main body in a variety of locations along the first cord section and the second cord section, and
wherein the first passage and the second passage are each configured to receive the respective cord section at a first end of the main body, to lead the respective cord sections to the respective cord lock via a respective first portion, to fold the respective cord section back on itself at the respective cord lock, and then return the respective cord sections back to the first end of the main body via a respective second portion.

2. The apparatus of claim 1, wherein the second portion of the respective passage further comprises a respective retention feature configured to retain the respective cord section in the respective second portion.

3. The apparatus of claim 1, wherein the first portion and the second portion of each passage define a respective U-shape and are thereby configured to cause each of the first cord section and the second cord section to form a respective U-shape when fully disposed in the respective passage.

4. The apparatus of claim 1, wherein the main body further comprises a second end opposite the first end, and a portion of a connection assembly disposed at the second end and remote from the first passage and from the second passage.

5. The apparatus of claim 1,
wherein the first passage and the second passage are each configured to fold the respective cord section back on itself 180 degrees.

6. The apparatus of claim 1,
wherein each second portion defines a respective groove that is recessed into a top of the main body and that is configured to permit the respective second cord section to be selectively moved there into and there out,
wherein each first portion connects the first end to the respective cord lock and is disposed between the respective second portion and a bottom of the main body.

7. The apparatus of claim 6,
wherein each cord lock is disposed between the top and the bottom of the main body;
wherein each first portion is disposed fully within the main body from the first end to the respective cord lock.

8. The apparatus of claim 6,
wherein the main body further comprises a finger groove recessed into the bottom of the main body and oriented transverse to the first passage and to the second passage.

9. An apparatus, comprising:
a main body comprising: a first end; a second end opposite the first end; a top; a bottom; a first passage configured to pass a first cord section therethrough; a second passage disposed adjacent the first passage and configured to pass a second cord section therethrough; and at least one cord lock;
wherein when the first cord section and the second cord section are disposed in the first passage and the second passage respectively, the first cord section and the second cord section can be selective moved into and out of the at least one cord lock thereby enabling selective locking of the main body in a variety of locations along the first cord section and the second cord section;
wherein the main body defines a grip comprising at least one finger groove recessed into the bottom of the main body and oriented transverse to the first passage and transverse to the second passage, and
wherein each passage is configured to fold the respective cord section back on itself so that each cord section enters the first end of the main body, forms a respective loop within the main body, and exits the main body at the first end.

10. The apparatus of claim 9,
wherein the first passage and the second passage each comprise an opening at the first end of the main body; and
wherein the main body further comprises a portion of a connection assembly disposed at the second end of the main body opposite the first end and remote from each passage.

11. The apparatus of claim 9, wherein the at least one cord lock comprises a first cord lock disposed in the first passage and a second cord lock disposed in the second passage.

12. The apparatus of claim 11, wherein the first passage defines a first U-shaped circuit, and
wherein the second passage defines a second U-shaped circuit.

13. The apparatus of claim 12,
wherein the first cord lock is disposed between a first portion and a second portion of the first passage, wherein the second portion defines a groove that is open through the top of the main body; and
wherein the second cord lock is disposed between a first portion and a second portion of the second passage, wherein the second portion defines a groove that is open through the top of the main body.

14. The apparatus of claim 13, wherein the first cord section and the second cord section can be selectively moved into and out of the second portions respectively to selectively move the first cord section into and out of the first cord lock and the second cord section into and out of the second cord lock.

15. The apparatus of claim 13,
wherein the second portion of the first passage further comprises a first retention feature configured to retain the first cord section therein; and wherein the second portion of the second passage further comprises a second retention feature configured to retain the second cord section therein.

16. An apparatus, comprising:
a main body, comprising:
   a first portion of a first passage that leads to a first cord lock, and a second portion of the first passage in which a first cord section can be selectively positioned to bypass the first cord lock or to engage the first cord lock; and
   a first portion of a second passage that leads to a second cord lock, and a second portion of the second passage in which a second cord section can be selectively positioned to bypass the second cord lock or to engage the second cord lock;
wherein each passage is configured to fold the respective cord section back on itself so that each cord section enters a first end of the main body, forms a respective loop within the main body, and exits the main body at the first end.

17. The apparatus of claim 16, further comprising a grip comprising at least one finger groove recessed into a bottom of the main body and oriented transverse to the first portion of the first passage and transverse to the first portion of the second passage.

18. The apparatus of claim 16, further comprising a cord comprising the first cord section and the second cord section, wherein the cord forms a loop that is routed through the first portion of the first passage, then the second portion of the first passage, then the second portion of the second passage, and then the first portion of the second passage.

19. The apparatus of claim 18, further comprising:
a watersports board rack comprising a recess configured to receive a watersports board, wherein ends of the cord are secured to a first side of the recess; and
a connection assembly configured to secure the main body to a second side of the recess.

20. An apparatus, comprising:
a main body, comprising:
   a first portion of a first passage that leads to a first cord lock, and a second portion of the first passage in which a first cord section in the first portion of the first passage can be selectively positioned to bypass the first cord lock or to engage the first cord lock; and
   a first portion of a second passage that leads to a second cord lock, and a second portion of the second passage in which a second cord section in the first portion of the second passage can be selectively positioned to bypass the second cord lock or to engage the second cord lock;
a cord comprising the first cord section and the second cord section, wherein the cord forms a loop that is routed through the first portion of the first passage, then the second portion of the first passage, then the second portion of the second passage, and then the first portion of the second passage;
a watersports board rack comprising a recess configured to receive a watersports board, wherein ends of the cord are secured to a first side of the recess; and
a connection assembly configured to secure the main body to a second side of the recess.

* * * * *